US011709687B2

United States Patent
(12) United States Patent
Schlegel et al.

(10) Patent No.: US 11,709,687 B2
(45) Date of Patent: Jul. 25, 2023

(54) SYSTEM FOR FACILITATING ADVANCED CODING TO INDIVIDUALS WITH LIMITED DEXTERITY

(71) Applicant: BeEnabled, L.L.C., Columbus, OH (US)

(72) Inventors: Jennifer Grace Schlegel, Columbus, OH (US); Ryan Thomas Williamson, Dublin, OH (US)

(73) Assignee: BeEnabled, L.L.C., Columbus, OH (US)

(*) Notice: Subject to any disclaimer, the term of this patent is extended or adjusted under 35 U.S.C. 154(b) by 0 days.

(21) Appl. No.: 17/221,778

(22) Filed: Apr. 3, 2021

(65) Prior Publication Data

US 2021/0311750 A1 Oct. 7, 2021

Related U.S. Application Data

(60) Provisional application No. 63/005,263, filed on Apr. 4, 2020.

(51) Int. Cl.

| | |
|---|---|
| ***G06F 9/451*** | (2018.01) |
| ***G06F 3/041*** | (2006.01) |
| ***G06F 3/04842*** | (2022.01) |
| ***G06F 3/04886*** | (2022.01) |

(52) U.S. Cl.

CPC ............ *G06F 9/451* (2018.02); *G06F 3/0416* (2013.01); *G06F 3/04842* (2013.01); *G06F 3/04886* (2013.01); *G06F 3/0414* (2013.01); *G06F 2203/04104* (2013.01)

(58) Field of Classification Search

CPC .... G06F 9/451; G06F 3/0416; G06F 3/04842; G06F 3/04886; G06F 3/0414; G06F 2203/04104; G06F 3/0488

See application file for complete search history.

(56) References Cited

U.S. PATENT DOCUMENTS

| | | | | |
|---|---|---|---|---|
| 2003/0090473 | A1* | 5/2003 | Joshi | G06F 3/0237 345/173 |
| 2008/0165140 | A1* | 7/2008 | Christie | G06F 3/04883 345/173 |
| 2011/0215914 | A1 | 9/2011 | Edwards | |

(Continued)

OTHER PUBLICATIONS

Rosenblatt et al., Vocal Programming for people with upper-body motor impairments, https://dl.acm.org/doi/pdf/10.1145/3192714.3192821, Apr. 23, 2018.

(Continued)

*Primary Examiner* — Cao H Nguyen

(74) *Attorney, Agent, or Firm* — McDonnell Boehnen Hulbert & Berghoff LLP

(57) ABSTRACT

A method and system for improving accessibility of advanced coding to individuals with limited dexterity using a personalized screen touch option as replacement of standard typing, to the user's functional mobility ability. The system and method involve a touchscreen coding platform and a personalized screen touch option corresponding to the user's functional mobility activity, which allows the user to write with their prefer code language at a professional level. All actions on the coding platform may be performed with finger taps allowing individuals with limited dexterity to perform complex coding.

20 Claims, 6 Drawing Sheets

Code if else

40

36

(56) References Cited

U.S. PATENT DOCUMENTS

| | | | | |
|---|---|---|---|---|
| 2013/0246904 | A1 | 9/2013 | Seliger et al. | |
| 2014/0365882 | A1* | 12/2014 | Lemay | G06F 3/016 715/256 |
| 2016/0162146 | A1* | 6/2016 | Wu | G06F 3/0488 715/776 |
| 2017/0075701 | A1 | 3/2017 | Ricci et al. | |
| 2019/0243621 | A1 | 8/2019 | Gass et al. | |
| 2020/0356350 | A1* | 11/2020 | Penland | G06F 8/34 |

OTHER PUBLICATIONS

Yu et al., "An MHealth App for Users with Dexterity Impairments-Accessibility Study," https://mhealth.jmir.org/2019/1/e202/pdf, Jan. 10, 2019.

International Search Report and Written Opinion for PCT/US2021/025681.

* cited by examiner

FIG. 6

SYSTEM FOR FACILITATING ADVANCED CODING TO INDIVIDUALS WITH LIMITED DEXTERITY

This non-provisional application claims priority to and the benefit of U.S. Provisional Patent App. No. 63/005,263, filed on Apr. 4, 2020, herein incorporated in its entirety by reference.

Computer coding is the use of computer programming languages to give computers and machines instructions on what actions to perform. Said instructions are given in the form of a code. A code is a term used to describe text that is written using the protocol of a particular programing language. Coding involves translating and writing codes from one language to another. Simply stated, coding is the process of using a programming language to get a computer or machine to behave the way one wants. Every line of code tells the computer or machine to do something.

The ability to code is a valuable one and a highly desirable technical skill. It provides opportunities for unique technological problem solving. However, coding not only requires computer programming knowledge; it often requires an individual to have significant dexterity. A person must be capable to type quickly for long periods in order to create a working code.

Unfortunately, not all individuals have the manual dexterity required to type as quickly as required for coding. Other individuals do not have dexterity to type at all. As a result, these individuals are often not given a real opportunity to code or they are pushed out of the coding field as their dexterity declines.

Currently available coding methods use dragging of coding blocks as a replacement to typing. However, these alternative methods are not helpful to individuals with limited dexterity as they often struggle with both typing and dragging. Other coding methods use speech-to-text functionality as a substitute to typing. However, these alternative methods can be socially ostracizing, as the person would have to speak out the code they are writing. Furthermore, these types of coding methods are very cumbersome, as they require the user to learn code words for a variety of tasks, including deleting text, moving the cursor back and forward, and adding new phrases. Moreover, speech-to-text coding methods do not provide a solution for those individuals who struggle with both speech difficulties and limited dexterity. Therefore, there is still a need for a system and method to facilitate advanced coding for people with physical functional difficulties.

Currently disclosed is a system and method for improving accessibility of advanced coding to individuals with limited dexterity using single screen touch coding options as replacement of standard typing. The currently disclosed system and method involve a touch-screen coding platform allowing a user to write with their prefer code language at a professional level. All actions on the coding platform may be performed with finger taps allowing individuals with limited dexterity to perform complex coding.

Currently disclosed is a computer-implemented method comprising: at a computing device with a multipoint sensing touchscreen, a processor, and a memory: responsive to a first user interaction with the multipoint sensing touchscreen, accessing a database of a server, wherein the database of the server comprises a plurality of coding language libraries; selecting at least one coding language library of the plurality of coding language libraries; transmitting the at least one coding language library from the server through a network to the computing device; and adding the at least one coding language library to a library section of a user interface on the computing device; responsive to a second user interaction with the multipoint sensing touchscreen, entering the user interface, wherein the user interface comprises a plurality of sections, including the library section, a command window, an output window, a variables panel, and a control panel, wherein the library section includes the at least one coding language library, the at least one coding language library comprising commands separated in different categories; responsive to a third user interaction with the multipoint sensing touchscreen, assigning a determined action to a personalized screen touch by the user on the multipoint sensing touchscreen, wherein the personalized screen touch includes a single touch on the multipoint sensing touchscreen, wherein the determined action correspond to an action to be taken relating to the commands of the at least one coding language library in the library section to reduce typing amount to be done by the user; responsive to a fourth user interaction with the multipoint sensing touchscreen, accessing the at least one coding language library; selecting at least one command of the at least one coding language library; and applying the determined action to the selected command.

The determined action may comprise auto-population of the selected at least one command to the command window of the user interface. Further, the method may comprise assigning a second determined action to a second personalized screen touch by the user on the multipoint sensing touchscreen.

The user's personalized screen touch may comprise a single touch to the touchscreen. The user's personalized screen touch may further comprise two consecutive touches or a double touch on the multipoint sensing touchscreen. Further, the user's personalized screen touch may comprise a pressure parameter, wherein the pressure parameter includes light pressure and/or heavy pressure.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 6 illustrates a user interface of the currently disclosed system.

DETAILED DESCRIPTION OF THE DRAWINGS

Figure 1:
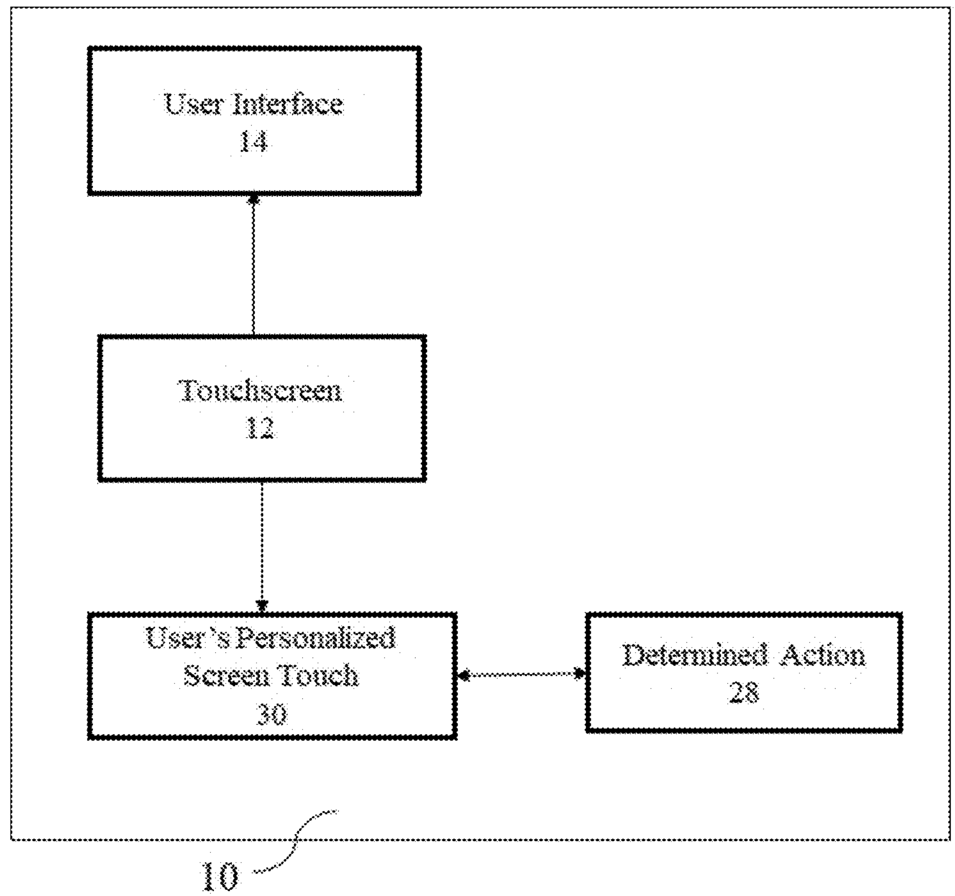
FIG. 1 illustrates a flowchart of the currently disclosed system.
Figure 2:
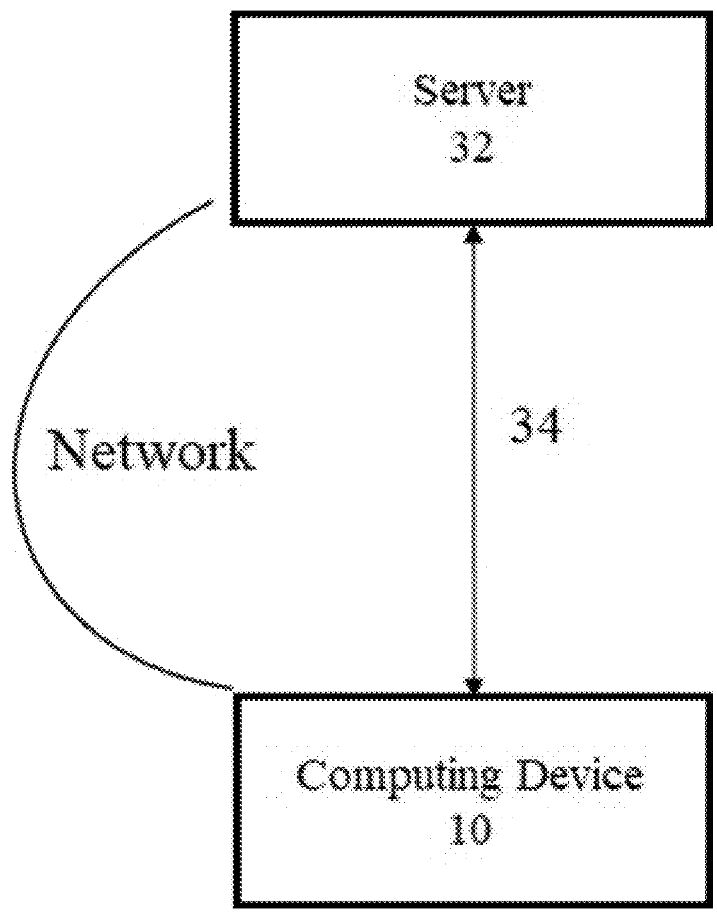
FIG. 2 illustrates a flowchart of the currently disclosed system.

FIGS. 1-6 illustrate the currently disclosed computer-implemented method and system for improving accessibility of advanced coding to individuals with physical functional difficulties, such as limited dexterity, without solely relying on the individual's clarity of speech. The currently disclosed method and system provide a touch-screen coding platform that allows individuals with limited dexterity to code at a professional level using their preferred coding language wherein coding actions may be performed with finger taps; thus, decreasing the amount of typing required by the user.

As shown in FIGS. 1-6, in a computing device 10 with a multipoint sensing touchscreen 12, a user taps on the touchscreen 12 to enter a user interface 14. The user interface 14 comprises of a plurality of sections, including a library section, a command window 18, an output window 20, a variable panel 22, and a control panel 24. The library section includes at least one coding language library 16 comprising of commands or code blocks. The commands will vary depending on the coding language of the at least one coding language library 16.

Figure 4:
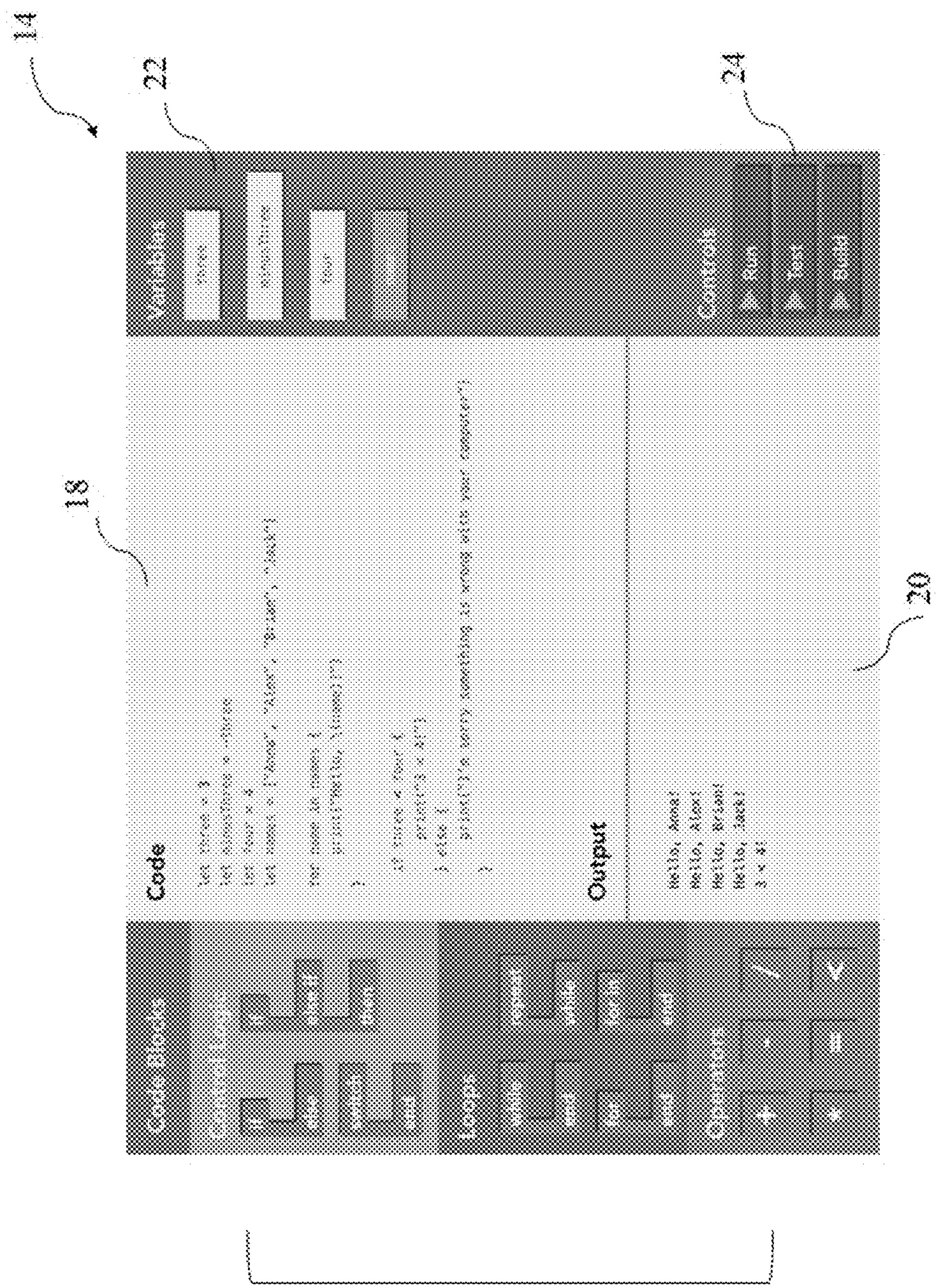
FIG. 4 illustrates a user interface of the currently disclosed system.

The commands or code blocks are separated in different categories. As illustrated in FIG. 4, the commands or code blocks may be separated in if else statements, loops, or operators. The commands or code blocks may also be separated based on other functions such as saving data, exporting data, and reading data. The commands may include standard commands and non-standard commands. Standard and non-standard commands will vary depending on the coding language. For example, standard commands may include commands for each mathematical operator, looping, saving files, exporting data to files, loading data from files, and indexing data. Whereas, non-standard commands may include commands to run statistical tests, for example, t-tests or tests for determining the min, max, mode, and/or mean of a set of data.

The currently disclosed method and system makes advanced coding more accessible to individuals with limited dexterity by providing one-touch coding options. The one-touch coding option comprises of a personalized screen touch 30 selected by the user based on their physical functional mobility. The user's personalized screen touch 30 may comprise of a single touch to the touchscreen. Additionally, or alternatively, the user's personalized screen touch may comprises two consecutives touches to the screen. Additionally, or alternatively, the user's personalized screen touch may comprise a drawn shape, for example, a circle or the number eight (8). Further, the user's personalized screen touch may comprise a pressure parameter based on the user's physical ability. The user's personalized screen touch may include light pressure to the screen or a heavy pressure to the screen.

The user's personalized screen touch provides for a readily interaction between the user and the touchscreen. The user of the computing device 10 taps the touchscreen 12 and assigns a determined action 28 to their personalized screen touch 30. The determined action correspond to an action to be taken relating to the commands of the at least one coding language library 16 to reduce amount of typing to be done by the user. For example, the determined action may comprise auto-population of a selected command to the command window 18. The selected command may be automatically placed following the last entered command in the command window. Alternatively, the command may be placed on a previously selected position in the command window. Auto-population of a selected command reduces the amount of typing required; thus, making advanced coding more accessible to individuals with limited dexterity.

The user may have more than one personalized screen touch. Each personalized screen touch would correspond to a separate determined action resulting in a decrease of required typing. A user may have different personalized screen touch preferences that may use to designate different actions for the same part of the screen. For example, a user might use a light tap on a variable in the variable panel to auto-populate the variable in the body of the code while using a heavy tap to activate the same variable. Once the variable is activated, the user may then use light taps to move the variable up and down using corresponding up and down arrows on a popup window or to tap a deletion symbol. Using that same light tap on a command in the command window, the user might auto-populate the command into the body of the code.

Alternatively, or additionally, the user may activate a variable and then user light taps to delete the activated variable or to rename all instances of the activated variable. The user may also use a personalized screen touch and assigned a determined action to activate a scroll function to re-order code lines. As shown, the currently disclosed system provides the user with a way to perform most of the coding steps while using only personalized screen touches; thus, decreasing the amount of typing required.

The user may access the user interface from more than one computing device. The user personalized screen touch or touches may be automatically transferred from one computing device to another computing device. Alternatively, the user may set up new screen touch preferences according the computing device.

The currently disclosed method and system provide a touchscreen coding platform that allows individuals with limited physical functionality to code at a professional level using their preferred coding language. The user taps the touchscreen 12 of the computing device 10 accessing a server 32. The server 32 includes a database comprising a plurality of coding language libraries. The user selects at least one coding language library 34. The server transmits the selected coding language library through a network to the computing device, and the library is added to the library section in the user interface. The library section may include more than one coding language library. As indicated above, the user may then select one coding language library 16. Then, the commands or code blocks associated with said coding language library are placed in the user interface to be used by the user for coding. The commands are separated by categories, for example, loops are grouped together. Similarly, all different mathematical and logical operators are grouped together.

Figure 3:
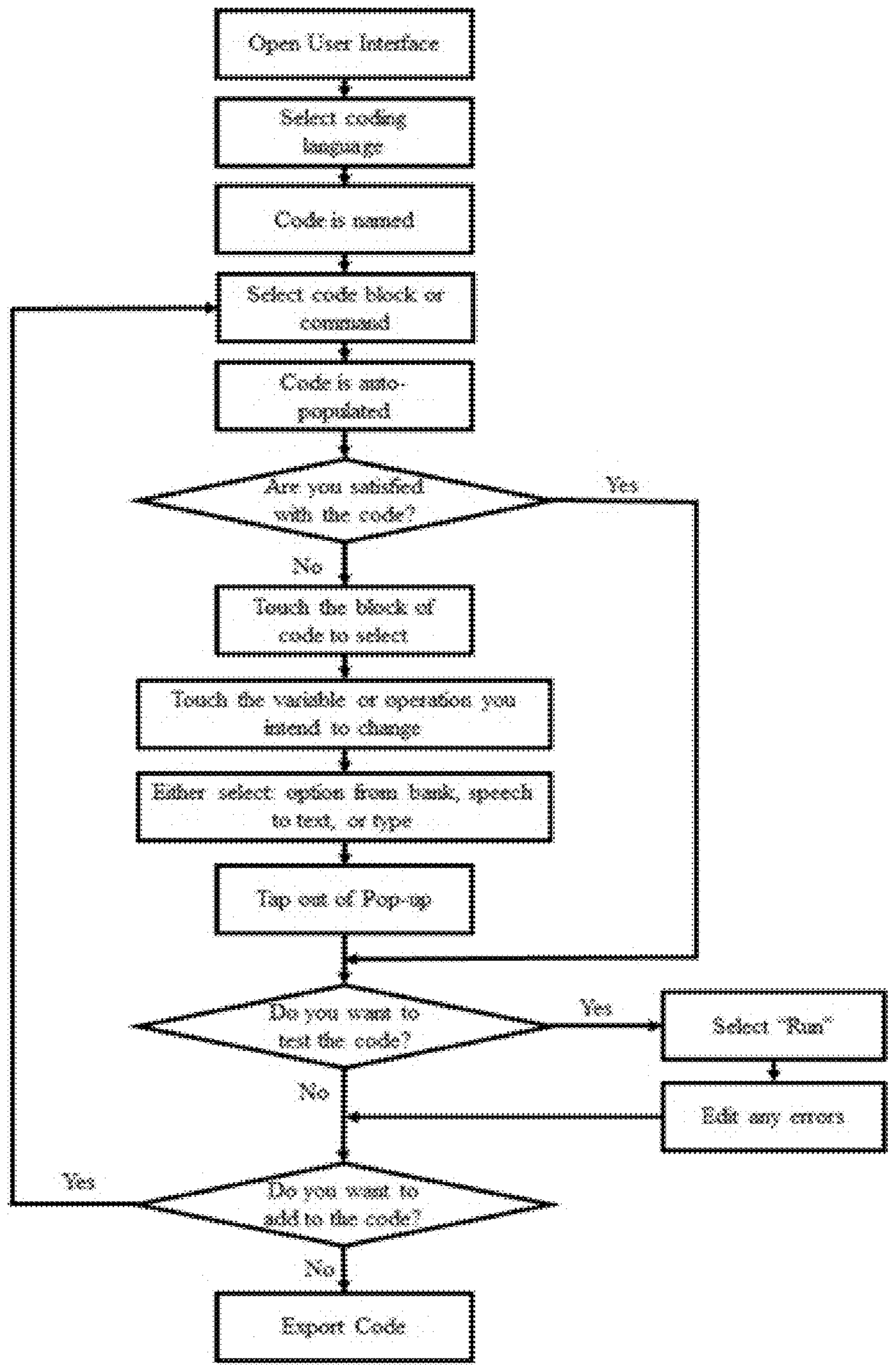
FIG. 3 illustrates a flowchart of the currently disclosed system.

FIG. 3 shows a flowchart of an embodiment of the currently disclosed system. The user access the user interface and selects their preferred coding language from the library section. Once the preferred coding language library is selected, the commands or code blocks associated with said coding language library are available for coding. The user may manually name the code or the code may be automatically named.

To begin coding, the user then selects a code block or command from the coding language library using their personalized screen touch; thus, signaling the system to apply the determined action. For example, if the determined action is auto-population to the command window, once the user selects the command using their personalized screen touch, said command is automatically placed in the command window as a code in the code language elected looking similarly to a code found in a compiler. If the user is satisfied with the code in the command window, then the user may continue to test the code. If the user is not satisfied with the code in the command window, then the user may then select the code to be amended.

Figure 5:
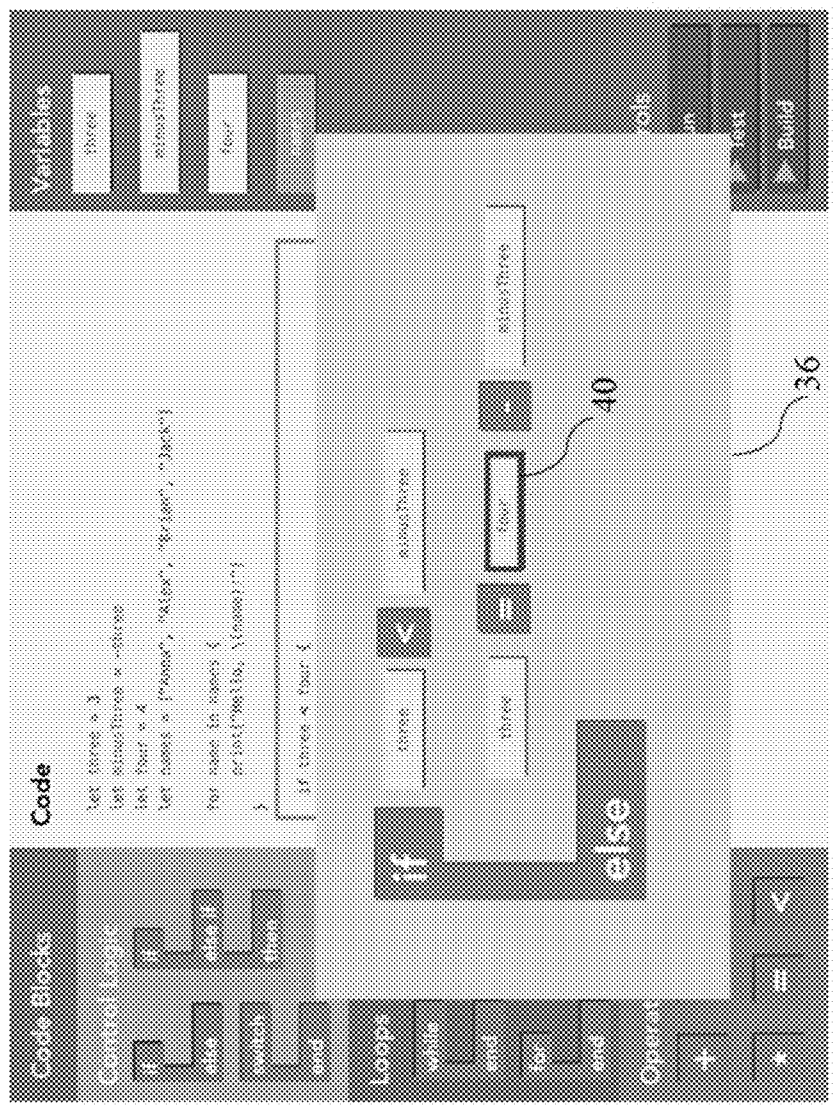
FIG. 5 illustrates a user interface of the currently disclosed system.
Figure 6:
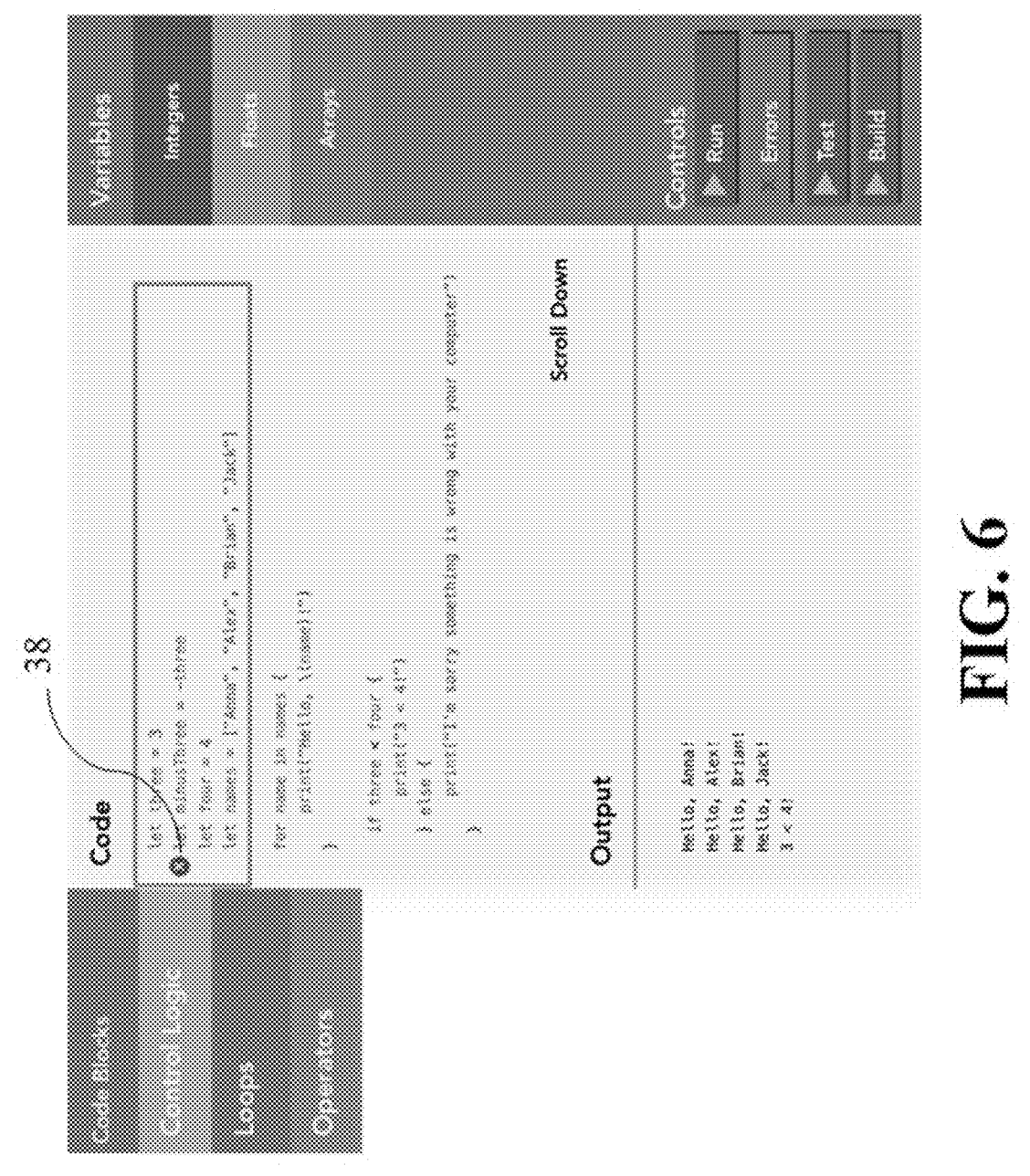

As illustrated in FIGS. 5 and 6, the user may select the code in the command window causing a popup window 36 to open with the code block as the focus item. The user may then combine additional code blocks and/or add variables to create a syntactically correct condition. The popup window makes it easier for those with limited dexterity to interact with the code as it provides a large touch interaction target allowing modifications, additions, and subtractions to correct any errors.

The user may then test the code to determine if there are any errors. The system may further identify the code block with a syntax or logical error. For example, as illustrated in FIGS. 5 and 6, the system will annotate the grouped together code block lines with a "X" 38 and an outlined box 40 identifying the code block with a syntax or logical error. The error highlighting is extended into the code block popup and continues nesting until the user reaches the specific section with the error. Additionally, once a code block is selected that is already in program, up and down arrows may appear to move the blocks location within the code. The system recognizes when a block is moved into a nested block and adjust the code accordingly.

When all necessary changes are made, the user may export the code. Once the code is exported, the code may be able to run on other coding platforms.

While this invention has been shown and described with respect to a detailed embodiment thereof, it will be understood by those skilled in the art that changes in form and detail thereof may be made without departing from the scope of the claims of the invention.

What is claimed is:

1. A computer-implemented method comprising:

at a computing device with a multipoint sensing touchscreen, a processor, and a memory:

responsive to a first user interaction with the multipoint sensing touchscreen:

accessing a database of a server, wherein the database of the server comprises a plurality of coding language libraries;

selecting at least one coding language library of the plurality of coding language libraries;

receiving, the at least one coding language library from the server and through a network to which the computing device is connected; and in response to the receiving, automatically populating a library section of a user interface on the computing device with the at least one coding language library to a library section of a user interface on the computing device in the form of commands of the at least one coding language library, arranged in different categories within the library section;

responsive to a second user interaction with the multipoint sensing touchscreen, entering the user interface, wherein the user interface comprises a plurality of sections, including the library section, a command window, an output window, a variable panel, and a control panel, and wherein entering the user interface comprises configuring the computing device to receive and process, as inputs for coding using the at least one coding language library, only personalized screen touches of a user having limited physical functional mobility;

responsive to a third user interaction with the multipoint sensing touchscreen, assigning a determined action to a personalized screen touch by the user on the multipoint sensing touchscreen, wherein the personalized screen touch includes a single touch on the multipoint sensing touchscreen and is selected based on a physical functional mobility of the user, and wherein the determined action corresponds to an action to be taken relating to the commands of the at least one coding language library in the library section to reduce typing amount to be done by the user; and responsive to a fourth user interaction with the multipoint sensing touchscreen relative to the library section of the user interface:

selecting at least one command of the at least one coding language library from the library section of the user interface; and applying the determined action to the selected command.

2. The computer-implemented method as claimed in claim 1, wherein the determined action comprises auto-population of the selected at least one command in the command window of the user interface.

3. The computer-implemented method as claimed in claim 1, wherein the determined action further correspond to an action to be taken relating to variables in the variable panel to reduce typing amount to be done by the user.

4. The computer-implemented method as claimed in claim 1, further comprising assigning a second determined action to a second personalized screen touch by the user on the multipoint sensing touchscreen.

5. The computer-implemented method as claimed in claim 1, wherein the personalized screen touch includes a double touch on the multipoint sensing touchscreen display.

6. The computer-implemented method as claimed in claim 1, wherein the personalized screen touch further includes a pressure parameter on the multipoint sensing touchscreen display.

7. The computer-implemented method as claimed in claim 1, wherein the commands of the at least one coding language library comprise standard commands according to the corresponding coding language, said commands are saved on the memory of the computing device.

8. A system configured to improving accessibility to advanced coding to individuals with limited dexterity, the system comprising a computing device comprising:

a multipoint sensing touchscreen, a processor, and a memory configured to store instructions that, when executed by the processor, causes the system to carry out steps that include:

responsive to a first user interaction with the multipoint sensing touchscreen:

accessing a database of a server, wherein the database of the server comprises a plurality of coding language libraries;

selecting at least one coding language library of the plurality of coding language libraries;

receiving, the at least one coding language library from the server and through a network to which the computing devices is connected; and in response to the receiving, automatically populating a library section of a user interface on the computing device with the at least one coding language library in the form of commands of the at least one coding language library, arranged in different categories within the library section;

responsive to a second user interaction with the multipoint sensing touchscreen, entering the user interface, wherein the user interface comprises a plurality of sections, including the library section, a command window, an output window, a variable panel, and a control panel, and wherein entering the user interface comprises configuring the computing device to receive and process, as inputs for coding using the at least one coding language library, only personalized screen touches of a user having limited physical functional mobility;

responsive to a third user interaction with the multipoint sensing touchscreen, assigning a determined action to a personalized screen touch by the user on the multipoint sensing touchscreen, wherein the personalized screen touch includes a single touch on the multipoint sensing touchscreen and is selected based on a physical functional mobility of the user, and wherein the determined action corresponds to an action to be taken relating to the commands of the at least one coding language library in the library section to reduce typing amount to be done by the user; and responsive to a fourth user interaction with the multipoint sensing touchscreen relative to the library section of the user interface:

selecting at least one command of the at least one coding language library from the library section of the user interface; and applying the determined action to the selected command.

9. The system as claimed in claim 8, wherein the determined action comprises auto-population of the selected at least one command in the command window of the user interface.

10. The system as claimed in claim 8, wherein the determined action further correspond to an action to be taken relating to variables in the variable panel to reduce typing amount to be done by the user.

11. The system as claimed in claim 8, wherein the steps further include assigning a second determined action to a second personalized screen touch by the user on the multipoint sensing touchscreen.

12. The system as claimed in claim 8, wherein the personalized screen touch further includes a pressure parameter on the multipoint sensing touchscreen display.

13. The system as claimed in claim 8, wherein the commands of the at least one coding language library comprise standard commands according to the corresponding coding language, said commands are saved on the memory of the computing device.

14. A method performed by a computing device comprising a touchscreen, a processor and a memory, the method comprising:

receiving first user input that represents a command to select one of a plurality of coding language libraries;

in response to receiving the first user input, retrieving, from a server, the selected coding language library;

in response to retrieving the selected coding language library:

generating for display on the touchscreen a user interface comprising (i) a library section configured for organizing commands of the selected coding language library into one or more categories, (ii) a command window configured for displaying code of the selecting coding language library, including one or more commands selected by a user from the library section, (iii) a control panel configured for executing the code displayed in the command window, (iv) an output window configured for displaying a result of the execution of the code, and (v) a variable panel configured for displaying one or more selectable variables in accordance with the selected coding language library, and automatically populating the library section with commands from the selected coding language library;

receiving second user input that comprises a tap on the touchscreen and represents a command to select one or more actions of a plurality of actions stored in the memory to assign to a selected corresponding one of a plurality of personalized screen touches for the user stored in the memory, each of the plurality of personalized screen touches being configured for selection by the user based on limitations of physical functional mobility of the user, so as to reduce an amount of typing required by the user for coding;

in response to receiving the second user input, assigning the selected one or more actions to the selected personalized screen touch;

after assigning the selected one or more actions to the selected personalized screen touch, receiving third user input in the form of the selected personalized screen touch at a particular location of the user interface; and in response to receiving the third user input, and based on the particular location of the user interface, performing one of the assigned one or more actions.

15. The method of claim 14, wherein the plurality of personalized screen touches include a single touch in the form of a light-pressure tap on the touchscreen and a single touch in the form of a heavy-pressure tap on the touchscreen.

16. The method of claim 15, the plurality of actions include selecting a command from the library section, selecting a position within the command window for the command, and auto-populating the selected command into the selected position.

17. The method of claim 16, wherein the plurality of actions further include auto-populating a selected variable into a body of the code displayed in the command window, activating the variable, moving the activated variable up and down, deleting the activated variable, renaming all instances of the activated variable, and activating a scroll function to re-order lines of the code.

18. The method of claim 14, wherein the one or more categories comprise loops, control logic, and mathematical operators.

19. The method of claim 14, further comprising:

transferring, from the computing device to another, different computing device, data representing the assignment of the selected one or more actions to the selected personalized screen touch, thereby configuring the other computing device to use the selected personalized screen touch to perform the selected one or more actions in accordance with the assignment.

20. The method of claim 14, wherein the computing device is configured to receive and process, as inputs for coding using the at least one coding language library, only personalized screen touches of the user, including the selected personalized screen touch.

* * * * *